United States Patent
Geml et al.

(10) Patent No.: US 10,089,134 B2
(45) Date of Patent: Oct. 2, 2018

(54) CONTROLLING ACCESS TO NAMESPACES OF A STORAGE DEVICE

(71) Applicant: Western Digital Technologies, Inc., Irvine, CA (US)

(72) Inventors: Adam Christopher Geml, Rochester, MN (US); Colin Christopher McCambridge, Rochester, MN (US); Philip James Sanders, Rochester, MN (US); Lee Anton Sendelbach, Rochester, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 163 days.

(21) Appl. No.: 15/198,963

(22) Filed: Jun. 30, 2016

(65) Prior Publication Data

US 2018/0004559 A1   Jan. 4, 2018

(51) Int. Cl.
*G06F 9/46* (2006.01)
*G06F 9/455* (2018.01)
*G06F 21/62* (2013.01)

(52) U.S. Cl.
CPC ...... *G06F 9/45558* (2013.01); *G06F 21/6209* (2013.01); *G06F 21/6281* (2013.01); *G06F 2009/45595* (2013.01); *G06F 2221/2149* (2013.01)

(58) Field of Classification Search
None
See application file for complete search history.

(56) References Cited

U.S. PATENT DOCUMENTS

| | | |
|---|---|---|
| 9,003,071 B2 | 4/2015 | Liu |
| 2014/0195634 A1 | 7/2014 | Kishore et al. |
| 2014/0325013 A1 | 10/2014 | Tamir et al. |
| 2015/0006663 A1 | 1/2015 | Huang |
| 2015/0134871 A1 | 5/2015 | Benisty et al. |
| 2015/0319237 A1 | 11/2015 | Hussain et al. |

*Primary Examiner* — Gregory A Kessler
(74) *Attorney, Agent, or Firm* — Patterson & Sheridan, LLP; Steven Versteeg

(57) ABSTRACT

A method includes receiving, by virtual machine manager and from a virtual machine, a request for a set of namespace identifiers corresponding to a set of namespaces associated with one or more storage devices. The method also includes determining, by the virtual machine manager, one or more namespaces associated with the virtual machine from the set of namespaces associated with the one or more storage devices. The method further includes, in response to determining the one or more namespaces associated with the virtual machine, sending, by the virtual machine manager and to the virtual machine, a subset of the set of namespace identifiers, the subset of namespace identifiers corresponding to the one or more namespaces associated with the virtual machine.

20 Claims, 4 Drawing Sheets

| VM | AUTHORIZED NSID | AUTHORIZED CPU CORES | AUTHORIZED RAM ADDRESSES |
|---|---|---|---|
| 22A | 1, 2 | 1 | 1-4096 |
| 22B | 3 | 3 | 1-1028 |
| . | . | . | . |
| . | . | . | . |
| . | . | . | . |
| 22M | 10 | 4 | 4096-6152 |

FIG. 3

CONTROLLING ACCESS TO NAMESPACES OF A STORAGE DEVICE

TECHNICAL HELD

The disclosure generally relates to storage devices.

BACKGROUND

A host device may include a virtual machine manager (VMM) to virtualize, or simulate, one or more virtual machines (VMs). The VMM may manage the hardware resources (e.g., processor, memory, or the like) of the host device so that each VM appears to be running on separate hardware even if the resources are actually shared. The host device may be coupled to a storage device, such as a solid state drive (SSD) or hard disk drive (HDD), which may be logically divided into namespaces. Each of the VMs simulated by the host device may have access to every namespace of the storage device.

SUMMARY

In one example, a method includes receiving, by virtual machine manager and from a virtual machine, a request for a set of namespace identifiers corresponding to a set of namespaces associated with one or more storage devices; determining, by the virtual machine manager, one or more namespaces associated with the virtual machine from the set of namespaces associated with the one or more storage devices; and in response to determining the one or more namespaces associated with the virtual machine, sending, by the virtual machine manager and to the virtual machine, a subset of the set of namespace identifiers, the subset of namespace identifiers corresponding to the one or more namespaces associated with the virtual machine.

In another example, a system includes a virtual machine and a virtual machine manager. The virtual machine manager is configured to: receive, from the virtual machine, a request for a set of namespace identifiers corresponding to a set of namespaces associated. with one or more storage devices; determine one or more namespaces associated with the virtual machine from the set of namespaces associated with the one or more storage devices; and in response to determining the one or more namespaces associated with the virtual machine, send, to the virtual machine, a subset of the set of namespace identifiers, the subset of namespace identifiers corresponding to the one or more namespaces associated with the virtual machine.

In another example, a non-transitory computer-readable storage medium includes instructions that, when executed, cause one or more processors of a host device to: receive, from a virtual machine, a request for a set of namespace identifiers corresponding to a set of namespaces associated with one or more storage devices; determine one or more namespaces associated with the virtual machine from the set of namespaces associated with the one or more storage devices; and in response to determining the one or more namespaces associated with the virtual machine, send, to the virtual machine, a subset of the set of namespace identifiers, the subset of namespace identifiers corresponding to the one or more namespaces associated with the virtual machine.

The details of one or more examples are set forth in the accompanying drawings and the description below. Other features, objects, and advantages will be apparent from the description and drawings, and from the claims.

BRIEF DESCRIPTION OF DRAWINGS

FIGS. 3 is a conceptual and schematic block diagram illustrating example details of a resource provisioning table, in accordance with one or more techniques of this disclosure.

DETAILED DESCRIPTION

In general, this disclosure describes techniques for controlling access to logical units of a data storage device, such as a solid state drive (SSI)) or hard disk drive (MD). In some examples, a storage device may communicate with a host device using a Non-Volatile Memory Express (NVMe) protocol. In examples using the NVMe protocol, a logical unit of the storage device may be referred to as a namespace, such that the storage device may be logically divided into one or more namespaces. The host device may include multiple users and may control which namespaces of the data storage device each user may access. For example, the host device may include a virtual machine manager (VMM), which may also be referred to as a hypervisor, and one or more virtual machines (VMs). The VMM may receive a request from a particular VM for a set of namespaces identifiers corresponding to a set of namespaces associated with the storage device. However, the particular VM may not be authorized to access all of the namespaces associated with the storage device. Rather than sending the namespace identifiers for all of the namespaces associated with the storage device, the VMM may determine which namespaces the particular VM is authorized to access and may send only the namespace identifiers of the namespaces that the particular VM is authorized to access. By sending only the namespace identifiers of the namespaces that the particular VM is authorized to access, the VMM may hide other namespaces from the VM. In this way, the VMM may help prevent the particular VM from accessing the namespaces that the particular VM is not authorized to access.

Figure 1:
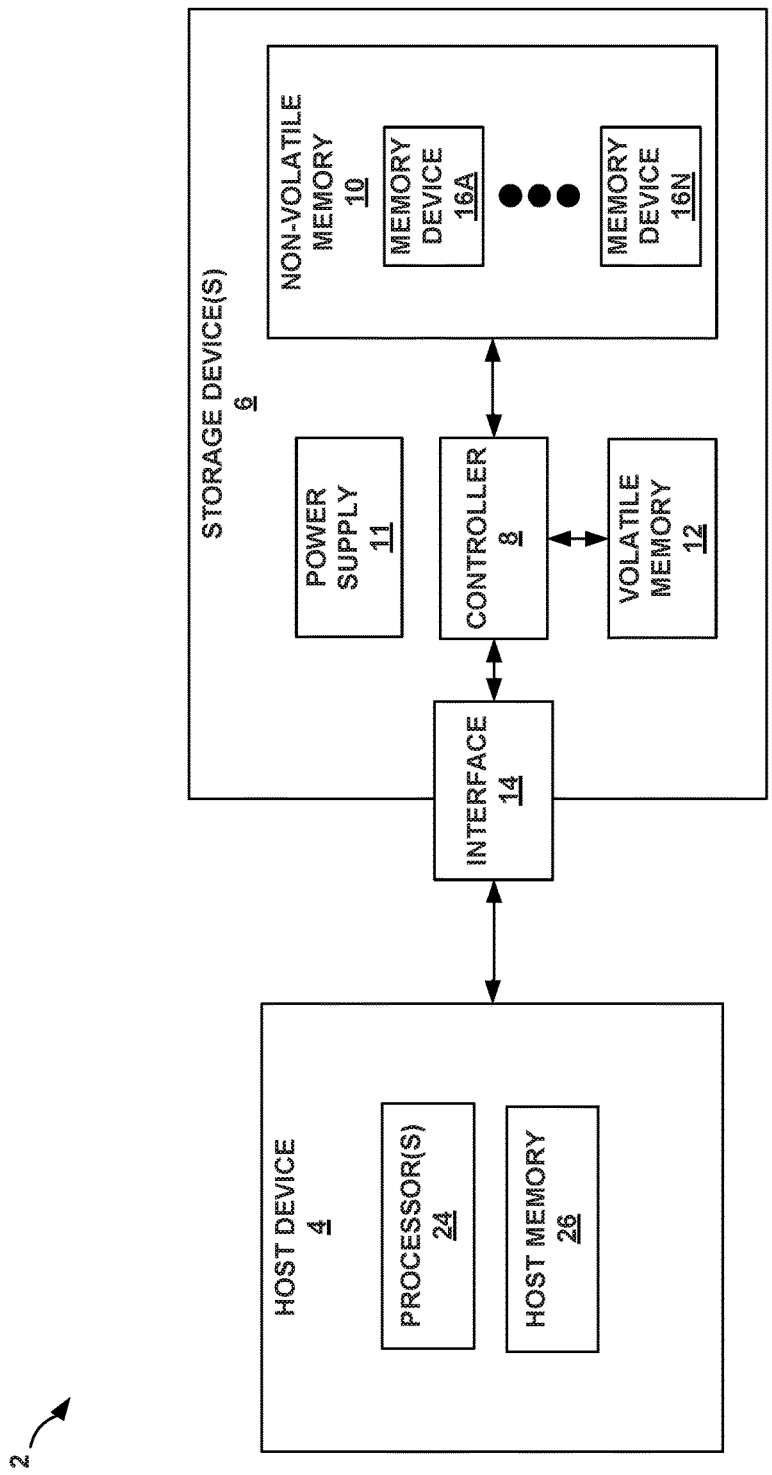
FIG. 1 is a conceptual and schematic block diagram illustrating an example storage environment in which a storage device may interact with a host device, in accordance with one or more techniques of this disclosure.

FIG. 1 is a conceptual and schematic block diagram illustrating an example storage environment 2 in which storage device 6 may function as a storage device for host device 4, in accordance with one or more techniques of this disclosure. For instance, host device 4 which may store data to and/or retrieve data from one or more storage devices 6. In some examples, storage environment 2 may include a plurality of storage devices, such as storage device 6, which may operate as a storage array. For instance, storage environment 2 may include a plurality of storages devices 6 configured as a redundant array of inexpensive/independent disks (RAID) that collectively function as a mass storage device for host device 4.

Host device 4 may include any computing device, including, for example, a computer server, a network attached storage (NAS) unit, a desktop computer, a notebook (e.g., laptop) computer, a tablet computer, a set-top box, a mobile computing device such as a "smart" phone, a television, a camera, a display device, a digital media player, a video gaming console, a video streaming device, or the like. Host device 4 may include at least one processor 24 and host memory 26. At least one processor 24 may include any form of hardware capable of processing data and may include a general purpose processing unit (such as a central processing unit (CPU)), dedicated hardware (such as an application specific integrated circuit (ASIC)), configurable hardware (such as a field programmable gate array (FPGA)), or any other form of processing unit configured by way of software instructions, microcode, firmware, or the like. Host memory 26 may be used by host device 4 to store information (e.g., temporarily store information). In some examples, host memory 26 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like).

As illustrated in FIG. 1, storage device 6 may include controller 8, non-volatile memory 10 (NVM 10), power supply 11, volatile memory 12, and interface 14. In some examples, storage device 6 may include additional components not shown in FIG. 1 for sake of clarity. For example, storage device 6 may include a printed board (PB) to which components of storage device 6 are mechanically attached and which includes electrically conductive traces that electrically interconnect components of storage device 6, or the like. In some examples, the physical dimensions and connector configurations of storage device 6 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.), M.2, or the like, In some examples, storage device 6 may be directly coupled (e.g., directly soldered) to a motherboard of host device 4.

Storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, as described in more detail with reference to FIG. 2-4, interface 14 may operate according to the Non-Volatile Memory Express (NVMe) protocol, However, in other examples, the techniques of this disclosure may apply to an interface 14 that operates in accordance with one or more of the following protocols: advanced technology attachment (ATA) (e.g., serial-ATA (SAT:), and parallel-ATA (PATA)), Fibre Channel, small computer system interface (SCSI), serially attached SCSI (SAS), peripheral component interconnect (PCI), PCI-express, or the like, The interface 14 (e.g., the data bus, the control bus, or both) is electrically connected to controller 8, providing a communication channel between host device 4 and controller 8, allowing data to be exchanged between host device 4 and controller 8. In some examples, the electrical connection of interface 14 may also permit storage device 6 to receive power from host device 4.

Storage device 6 may include volatile memory 12, which may be used by controller 8 to store information, In some examples, controller 8 may use volatile memory 12 as a cache. For instance, controller 8 may store cached information in volatile memory 12 until the cached information is written NVM 10. Volatile memory 12 may consume power received from power supply 11. Examples of volatile memory 12 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)).

Storage device 6 may include power supply 11, which may provide power to one or more components of storage device 6. When operating in a standard mode, power supply 11 may provide power to the one or more components using power provided by an external device, such as host device 4. For instance, power supply 11 may provide power to the one or more components using power received from host device 4 via interface 14. In sonic examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like.

Storage device 6 includes NVM 10, which includes a plurality of memory devices 16A-16N (collectively, "memory devices 16"), Each of memory devices 16 may be configured to store and/or retrieve data. For instance, a memory device of memory devices 16 may receive data and a message from controller 8 that instructs the memory device to store the data. Similarly, the memory device of memory devices 16 may receive a message from controller 8 that instructs the memory device to retrieve data. In some examples, each of memory devices 16 may be referred to as a die. In some examples, a single physical chip may include a plurality of dies (i.e., a plurality of memory devices 16). In some examples, each of memory devices 16 may be configured to store relatively large amounts of data (e.g., 128 MB, 51.2 MB, 1 GB, 4 GB, 16 GB, 64 GB, 11.28 GB, 512 GB, 1 TB, etc.). NVM 10 may include any type of non-volatile memory devices. Some examples of NVM 10 include, but are not limited to flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

Storage device 6 includes controller 8, which may manage one or more operations of storage device 6. For instance, controller 8 may manage the reading of data from and/or the writing of data to memory devices 16, Controller 8 may represent one of or a combination of one or more of a microprocessor, digital signal processor (DSP), application specific integrated circuit (ASIC), field programmable gate array (FPGA), or other digital logic circuitry.

Figure 2:
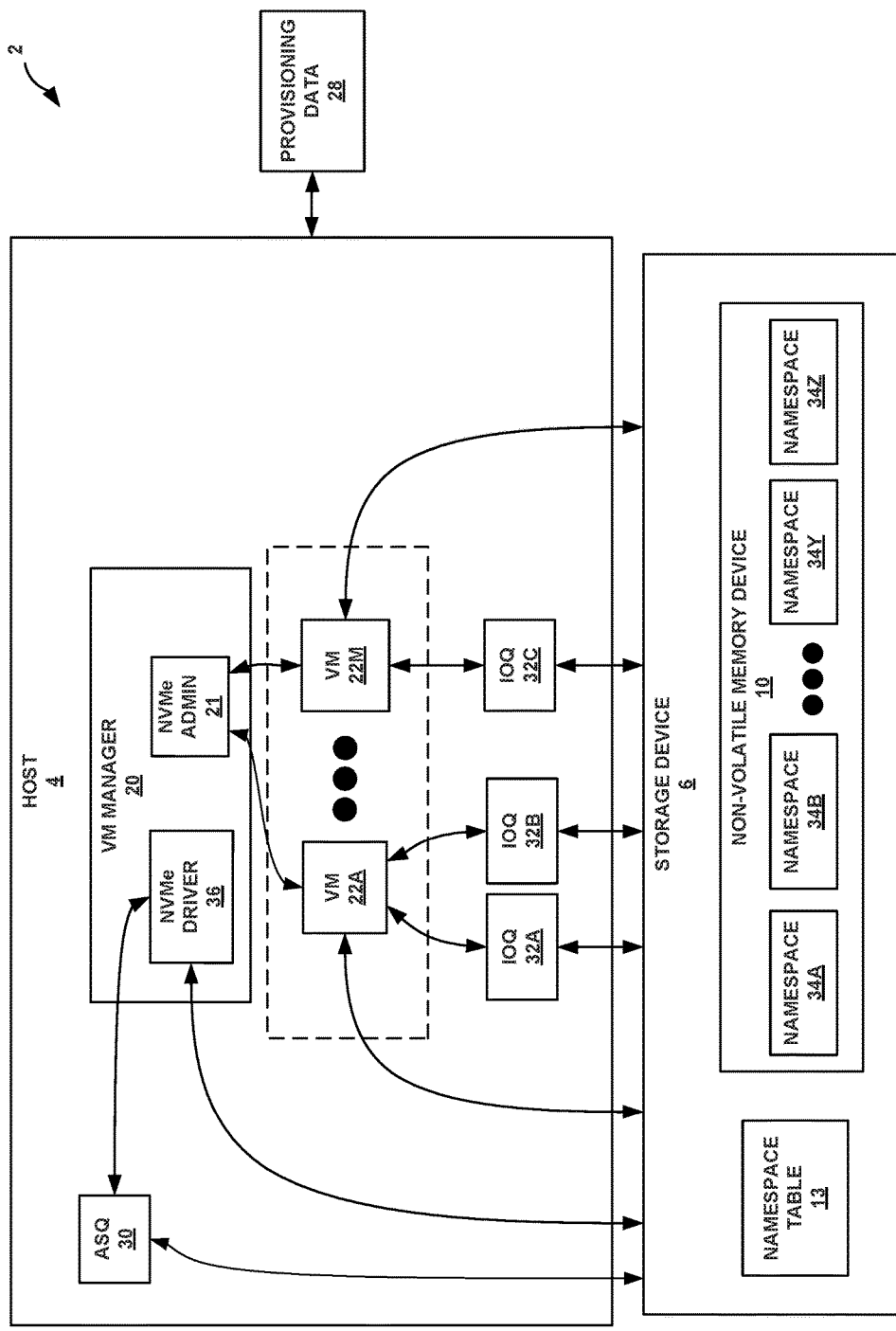
FIG. 2 is a conceptual and schematic block diagram illustrating an example storage environment in which a storage device may interact with a host device, in accordance with one or more techniques of this disclosure.

FIG. 2 is a conceptual and schematic block diagram illustrating further details of an example storage environment 2 in which storage device 6 may function as a storage device for host device 4, in accordance with one or more techniques of this disclosure. FIG. 2 illustrates and describes conceptual and functional elements of FIG. 1, with concurrent reference to the physical components illustrated in FIG. 1.

Storage device 6 includes NVM 10, which may be divided into logical units, For example, where host device 4 communicates with storage device 6 over an NVMe protocol, NVM 10 may be logically divided into a plurality of namespaces 34A-34Z (collectively, "namespaces 34"). Each namespace 34 may be associated with one or more logical block addresses (LBAs), and each LBA may be assigned to a single namespace of namespaces 34. Each namespace 34 may correspond to at least a respective portion of one or more memory devices 16. Storage device 6 may include namespace table 13. Namespace table 13 may include a data structure (e.g., a table, an array, or the like) that includes a set of namespace identifiers that each correspond to a respective namespace of namespaces 34. In some examples, namespace table 13 may be stored at volatile memory 12 or non-volatile memory 10.

Host device 4 may be configured to operate multiple virtual machines. To facilitate this, host device 4 (e.g., processor 24) may execute a virtual machine manager (VMM) 20, also referred to as a hypervisor. VMM 20 may be configured to generate and execute (or emulate) a plurality of virtual machines 22A-22M (collectively, "virtual machines 22" or "VMs 22"). For example, VMM 20 may include hardware, firmware, software, or a combination therein that is configured to share the physical resources (e.g., processors 24, host memory 26, and other components) of host device 4 among VMs 22. In other words, VMM 20 may enable multiple VMs 22 to use the same processor 24, host memory 26, or both.

VMM 20 may include, among other modules not shown in FIG, 2, a NVMe driver 36 and a NVMe admin module 21. NVMe driver 36 may include all driver data and functionality for controlling interaction between host 4 and storage device 6 according to the NVMe protocol. NVMe admin module 21 may be configured to manage administrative (admin) commands relating to interaction between VMs 22 and storage device 6, such as identification of namespaces 34 of storage device 6 to respective VMs of VMs 22, Each VM of VMs 22 represents an independent VM that utilizes a portion of the physical resources of host device 4, and may be configured to store data to and retrieve data from storage device 6. In some examples, VMM 20 may manage the transfer of data between storage device 6 and each VM of VMs 22. However, in these examples, VMM 20 may manage many read and write commands involving many VMs 20, which may reduce read and write performance. On the other hand, in some examples, such as an example where interface 14 operates according to the NVMe protocol, each respective VM of VMs 22 may send data directly to, and receive data directly from, storage device 6. In other words, VMM 20 may not manage each read and write command because VMs 22 may send data directly to (or receive data directly from) storage device 6, which may increase read and write performance.

In order to exchange data directly with storage device 6, each respective VM of VMs 22 may request the identities of the namespaces 34 of storage device 6 by sending an "identify" command to storage device 6, According to the NVMe standard, in response to receiving an identify command, storage device 6 may send the identities of each respective namespace of namespaces 34 of storage device 6 to the requesting VM of VMs 22. Thus, in some examples, each VM of VMs 22 may send read and write commands involving any of the namespaces 34 of storage device 6, However, it may be desirable to restrict access to NVM 10 so that a particular VM of VMs 22 is only authorized to read data from and to write data to one or more selected namespace of namespaces 34.

In accordance with examples of this disclosure, host device 4 (e.g., VMM 20) may control access by VMs of VMs 22 to namespaces 34, for example, by regulating the distribution of the identities of namespaces 34 of storage device 6 to VMs 22. In some examples, VMM 20 may regulate the distribution of the namespace identities by routing administrative ("admin") commands from VMs 22 through VMM 20 rather than allowing VMs 22 to send admin commands directly to storage device 6. In some instances, each VM 22 may send admin commands to NVMe admin manager 21 of VMM 20. For instance, a particular VM (e.g., VM 22A) may send an admin command (e.g., an identify command) to NVMe admin manager 21 requesting a set of namespace identifiers corresponding to a set of namespaces 34 associated with one or more storage devices 6. In other words, VM 22A may request the namespace identifiers from VMM 20 in order to be enabled to interact with (e.g., read data from or write data to) the namespaces 34.

NVMe admin manager 21 of VMM 20 may receive the request for the set of namespace identities. In response to receiving the request, VMM 20 may determine one or more namespaces that are associated with VM 22A from the set of namespaces 34. WM 20 may determine which namespaces are associated with VM 22A based on namespace table 13, provisioning data 28, or both.

In some examples, VMM 20 may determine which namespaces 34 are associated with VM 22A at least in part by querying namespace table 13. Namespace table 13 may include a list of namespaces associated with the one or more storage devices 6. In some instances, NVMe driver 36 of VMM 20 may query namespace table 13 by sending an indication of the identify command to storage device 6 via an Admin Submission Queue (ASQ) 30. Storage device 6 may receive an indication of the identify command via ASQ 30 and may send, to NVMe driver 36 of VMM 20, an indication of the respective namespace identifiers corresponding to all of the respective namespaces 34 of storage device 6. For example, storage device 6 may send the namespace identifier of each namespace 34 to VMM 20 or may send a value indicative of each namespace 34 that VMM 20 can map to a namespace identifier.

VMM 20 may additionally or alternatively query provisioning data 28. Provisioning data 28 may include a list of VMs 22, and for each VM of VMs 22, provisioning data 28 may specify a set of namespace identifiers corresponding to one or more namespaces 34 that each respective VM of VMs 22 is authorized to access. In response to querying provisioning data 28, VMM 20 may receive a set of namespace identifiers corresponding to one or more namespaces 34 a particular VM of VMs 22 is authorized to access. For instance, provisioning data 28 may indicate that VM of VMs 22 is authorized to access namespaces 34A and 34B. In some instances, provisioning data 28 may be stored in memory separate from host device 4 or storage device 6 (e.g., a remote server). In other instances, provisioning data 28 may be stored in host memory 26 of host device 4.

In some examples, in response to receiving the indication of the namespace identifiers from storage device 6, VMM 20 may determine one or more namespaces associated with the particular VM of VMs 22 (e.g., VM 22A). For example, VMM 20 may determine which namespace identifiers in the set of all namespace identifiers received from storage device 6 are also within the set of namespace identifiers received from provisioning data 28, For instance, VMM 20 may compare the set of all namespace identifiers to a subset of the namespaces 34 that VM 22A is authorized to access (e.g., as indicated by querying provisioning data 28). In some examples, VMM 20 may make the comparison in order to verify that the namespace identifiers associated with VM 22A in the provisioning data 28 correspond to actual namespaces of storage device 6. In other words, VMM 20 may compare the set of namespace identifiers from provisioning data 28 to the indication of the set of namespace identifiers received from storage device 6 to determine whether the namespaces that VM 22A is authorized to access exist on storage device 6. The one or more namespaces 34 associated with a particular VM 22 may include fewer namespaces 34 than the set of namespaces 34 associated with the storage device 6. For example, while storage device 6 may include namespaces 34A-34Z, VMM 20 may determine that VM 22A is only associated with two namespaces (e.g. 34A and 34B) based on a comparison of the identifiers received from storage device 6 and the identifiers received from querying provisioning data 28.

In some examples, in response to receiving an identify command from a particular VM (e.g., VM 22A), instead of sending an indication of the identify command to storage device 6, VMM 20 may refrain from sending an indication of the identify command to storage device 6, Rather, VMM 20 may query provisioning table 28 to determine which namespaces 34 are associated with VM 22A. For instance, in response to querying provisioning data 28, VMM 20 may receive a set of namespace identifiers corresponding to the namespaces 34 that VM 22A is authorized to access. Thus, VMM 20 may determine that the namespaces 34 associated with VM 22A are the namespaces that VM 22A is authorized to access, as received by provisioning data 28.

In response to determining the one or more namespaces associated with VM 22A, VMM 20 may send a subset of the set of namespace identifiers to VM 22A, where the subset of namespace identifiers correspond to the one or more namespaces associated with VM 22A. In other words, rather than sending VM 22A the respective namespace identifiers associated with each namespace of namespaces 34, VMM 20 may send only the namespace identifiers corresponding to the namespaces that VM 22A is authorized to access. Continuing the example above where provisioning data 28 indicates that VM 22A is authorized to access to namespaces 34A and 34B, VMM 20 may send only the namespace identifier associated with namespaces 34A and 3413 to VM 22A. In this way, VMM 20 may allow the VM of VMs 22 to access only certain namespace(s) of namespaces 34 (the namespaces associated with the VM of VMs 22) and prevent the VM of VMs 22 from accessing other namespace(s) of namespaces 34 (the namespaces not associated with the VM of VMs 22).

In response to receiving a subset of namespace identifiers from VMM 20, a VM (e.g., VM 22A) may send an admin command to VMM 20. For example, VM 22A may send a "create input/output queue (IOQ)" command to NVMe admin manager 21 of VMM 20. The create I/O queue command may specify one or more namespaces 34 with which the IOQ will be associated. In some examples, VMM 20 may send an indication of the create IOQ command to NVMe driver 36, which may store the command in Admin Submission Queue (ASQ) 30. In response to receiving a create IOQ command associated with a particular namespace from VM 22A, VMM 20 may execute the command by creating an IOQ associated with the particular namespaces specified by the create IOQ command. VMM 20 may allocate a predetermined amount of memory from host memory 26 to the IOQ. As illustrated in FIG. 3, host device 4 may include a plurality of IOQ, such as IOQ 32A-32C (collectively, IOQs 32). Each IOQ of IOQs 32 may include a submission queue and one or more completion queues associated with at least one namespace. In response to creating an IOQ, VMM 20 may send a notification to ASQ 30 indicating that the create IOQ command has been completed.

In some examples, a particular VM 22 may send separate create IOQ commands to create separate IOQs 32 for different namespaces, processor threads, or various combinations therein. For example, VMM 22A may send a first create IOQ command to create an IOQ 32A associated with a first namespace (e.g., namespace 34A) and a second IOQ command to create an IOQ 32B associated with a second, different namespace (e.g., namespace 34B). In some examples, a particular VM 22 may send a create IOQ command to VMM 20 in order to create an IOQ 32 associated with multiple namespaces. For instance, if VM 22M is authorized to access namespaces 34C-34G, VM 22M may send a single create IOQ command to VMM 20. As a result, VMM 20 may create IOQ 32C, which may be used by VM 22M to issue read and write commands for any of namespaces 34C-34G.

Upon creating an IOQ, each VM 22 may send data directly to, and receive data directly from, the namespaces that the respective VMs 22 are authorized to access via the IOQ. Continuing the example above, creating a first IOQ 32A associated namespace 34A and a second IOQ 32B associated with namespace 34B may enable VM 22A to interact directly with the respective namespaces 34A and 34B by sending a read or write command to the appropriate IOQ 32A or 32B. For instance, VM 22A may send a read command to IOQ 32A in order to read data from namespace 34A, Similarly, VM 22A may send a read command to IOQ 32B in order to read data from namespace 34B. In response to sending a read command to IOQ 32A, storage device 6 may receive a doorbell notification that a command has been submitted to IOQ 32A. As a result of the doorbell notification, storage device 6 may retrieve the command from IOQ 32A, determine that the command is a read command, retrieve data from the namespaces indicated by the read command, and send the data directly to VM 22A. Thus, once the IOQs 32A and 32B have been created, VM 22A may exchange data directly with NVM 10 without sending any data or commands to VMM 20.

In some examples, VMM 20 may send an indication of a set of namespace identifiers associated with one or more VMs to storage device 6 to allow storage device 6 (e.g., controller 8) to determine whether a VM of VMs 22 that issued a command is authorized to access the namespace of namespaces 34 identified by the command. For example, VMM 20 may send at least a portion of provisioning data 28 to storage device 6. Storage device 6 may receive provisioning data 28 and may store the data in volatile memory 12 or NVM 10. In response to receiving a read or write command from an IOQ 32, storage device 6 may determine whether to execute the command by determining whether the VM of VMs 22 that issued that command is authorized to access the namespace identified by the command. For example, VM 22A may send a read command to IOQ 32A, where the read command indicates a command to read data stored at namespace 34A. Storage device 6 may compare the namespace identifier included in the read command to provisioning data 28 to determine whether VM 22A is authorized to access the particular namespace 34. In response to determining that VM 22A is authorized to access namespace 34A, storage device 6 may retrieve the data from namespace 34A, send the data directly VM 22A (e.g., a portion of host memory 26 allocated to VM 22A), and may send an indication that the command is complete to IOQ 32A. In other examples, VMM 22A may send a read command to IOQ 32A, where the read command indicates a command to read data stored at namespace 34C. Storage device 6 may compare the namespace identifier included in the read command to provisioning data 28 and may determine that VM 22A is not authorized to access namespace 34C. As a result, storage device 6 may refrain from executing the command. In some examples, in addition to refraining from executing the command, storage device 6 may send an indication to VM 22A that VIM 22A is not authorized to access the namespace 34 indicated by the read command.

In this manner, a VMM may provide improved namespace security for the namespaces of a storage device. By determining the namespaces associated with a particular VM, VMM may send to the particular VM only the namespace identifiers that correspond to the namespaces associated with that particular VM. In this way, the VMM may hide the other namespaces from the particular VM. By hiding the other namespaces from the particular VM, the VMM may help prevent any of the VMs from sending data to or receiving data from a namespace the VM is not authorized to access. In some examples, a VMM may also provide namespace security by sending provisioning data to the storage device. In this way, the storage device may independently check the namespace specified by a read or write command to the provisioning data in order prevent unauthorized access to a namespace by a particular VM.

FIG. 3 is a conceptual and schematic block diagram illustrating example details of a data structure used to store resource provisioning data, in accordance with one or more techniques of this disclosure. For ease of illustration only, the data structure will be described as provisioning data table 300. However, the resource provisioning data may be stored in any type of data structure, For purposes of illustration only, provisioning data table 300 will be described with reference to FIGS. 1 and 2.

Provisioning data table 300 may store provisioning data 28 as described with reference to FIG. 2. In some examples, provisioning data table 300 may include M rows of data, where M equals the number of VMs 22. As shown in FIG. 3, provisioning data table 300 may include the columns VM identifier 302, authorized namespace identifier (NSID) 304, authorized CPU cores 306, and authorized RAM addresses 308. In some examples, provisioning data table 300 may include additional or fewer columns of data.

VM identifier 302 may include a unique identifier to identify each VM of VMs 22. Authorized namespace identifier (NSID) 304 may include one or more namespace identifiers associated with respective namespaces that each respective VM of VMs 22 is authorized to access. Authorized CPU cores 306 may include an indication of one or more CPU cores of the at least one processor 24 that each respective VM of VMs 22 is authorized to access. Authorized RAM addresses 308 may include an indication of RAM addresses of host memory 26 that each respective VM of VMs 22 is authorized to access.

In some examples, a particular VM of VMs 22 may be authorized to access a single namespace of namespaces 34. For instance, as illustrated in FIG. 3, VM 22B may be authorized to access a namespace associated with NSID #3. In other examples, a particular VM of VMs 22 may be authorized to access more than one namespace of namespaces 34. For example, VM 22A may be authorized to access NSIDs #1 and #2.

In operation, VMM 20 may receive, from a particular VM (e.g., VM 22A), a request for a set of namespace identifiers corresponding to a set of namespaces associated with storage device 6. For instance, VMM 22A may send an identify command to VMM 20. In response to receiving the request from VM22A, VMM 20 may determine one or more namespaces associated with VM 22A from the set of namespaces 34. The one or more namespaces associated with a particular VM may include the namespaces that the particular VM is authorized to access. For example, VMM 20 may query provisioning data table 300 to determine one or more namespace identifiers that correspond to the namespaces the particular VM is authorized to access. For instance, column Authorized NSID 304 may indicate that VM 22A is authorized to access namespaces associated with NSID #1 and NSID #2. In response to querying provisioning data table 300, VMM 20 may receive at least a portion of provisioning data 28, including one or more namespace identifiers that correspond to the one or more namespaces VM 22A is authorized to access. In other words, because column Authorized NSID 304 of provisioning data table 300 indicates that VM 22A is authorized to access the namespaces corresponding to NSIDs #1 and #2, the query may return namespace identifiers #1 and #2. VMM 20 may determine that the namespaces associated with VM 22A are the namespaces VM 22A is authorized to access, as received from provisioning data 28. In response to determining the namespace identifiers corresponding to the namespaces 34 that VM 22A is authorized to access, VMM 20 may send the set of the namespace identifiers to VM 22A.

VM 22A may receive the set of namespace identifiers corresponding to the namespaces associated with VM 22A and may send a command to VMM 20 in order to create an IOQ. VMM 20 may create the IOQ by allocating portion of host memory 26 such that VM 22A may send read command and write commands to the IOQ. In response to VM 22A sending a read command or a write command to IOQ, storage device 6 may retrieve the command from the IOQ and exchange data directly with VM 22A without the data going through VMM 20.

In some examples, VMM 20 may send at least a portion of provisioning data 28 in provisioning data table 300 to storage device 6. For example, VMM 20 may send a respective set of namespace identifiers associated with each respective VM of VMs 22 to storage device 6. In response to receiving a read or write command from an IOQ, storage device 6 may determine whether the particular VM of VMs 22 that issued the read or write command has access to the namespace specified by the read or write command. In some examples, storage device 6 may make the determination by comparing the namespace specified by the received read or write command to the provisioning data received from VMM 20. If the provisioning data indicates that the particular VM is authorized to access the namespace, storage device 6 may execute the command by sending data directly to the particular VM of VMs 22 or receiving data from the particular VM and storing the data to the namespace specified by the command.

Figure 4:
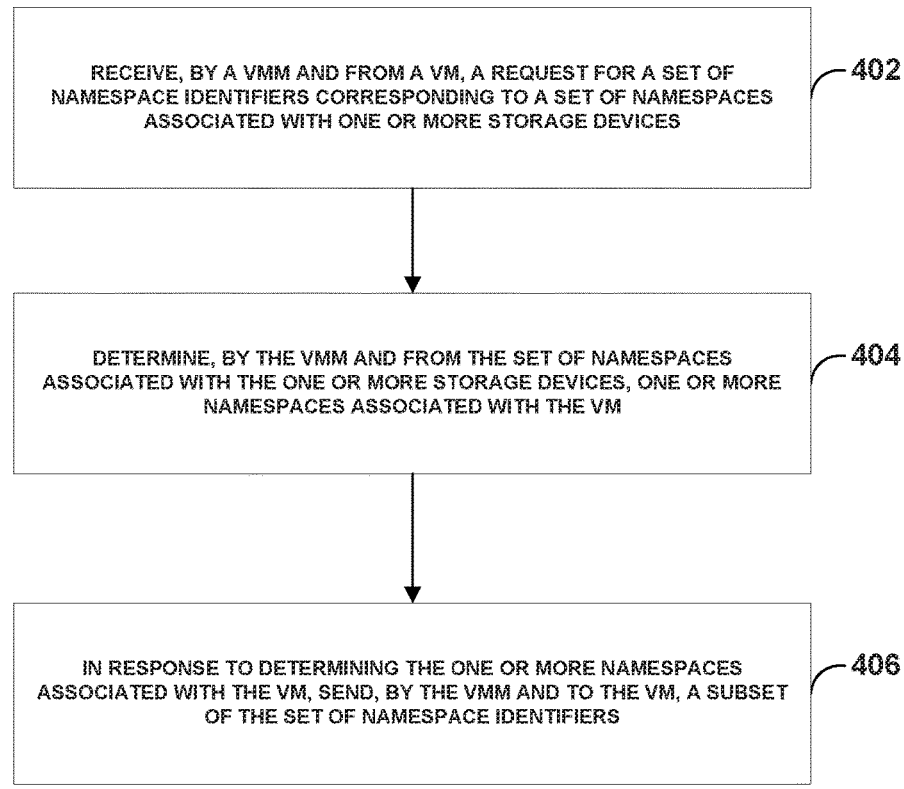
FIG. 4 is a flow diagram illustrating an example technique for controlling access to logical units of a data storage device, in accordance with one or more techniques of this disclosure.

FIG. 4 is a flow diagram illustrating an example technique for controlling access to logical units of a storage device, in accordance with one or more techniques of this disclosure. For ease of illustration, the technique of FIG. 4 will be described with concurrent reference to storage environment 2 of FIGS. 1 and 2. However, the techniques may be used with any combination of hardware or software.

In some examples, a VMM 20 may receive, from a VM of VMs 22, a request for a set of namespace identifiers corresponding to a set of namespaces associated with one or more storage devices (402). For example, a VM of VMs 22 may request the namespace identifiers from VMM 20 by sending an "identify" command to VMM 20. In some examples, VMM 20 may send an indication of the request for the set of namespace identifiers to one or more storage devices 6. In response to sending an indication of the request, VMM 20 may receive, from the one or more storage devices 6, an indication of the respective namespace identifiers corresponding to the namespaces of the one or more storage devices 6.

VMM 20 may determine one or more namespaces associated with the virtual machine from the set of namespaces associated with the one or more storage devices (404). In some examples, VMM 20 may make the determination by comparing the indication of the set of namespace identifiers received from the storage device 6 to provisioning data 28. Provisioning data 28 may specify a set of namespaces associated with each respective VM 22 (e.g., by including a list of namespace identifiers each respective VMM is authorized to access). In some examples, VMM 20 may compare the set of namespaces received from storage device 6 to provisioning data 28 to determine whether the namespaces the VM 22 is authorized to access are included within the namespaces 34 of storage device 6. For instance, if provisioning data 28 indicates that VM 22A is authorized to access namespaces corresponding to namespace identifiers #1 and #2, and the namespace identifiers received from storage device 6 does not include a namespace corresponding to namespace identifier #2, VMM 20 may determine that the only namespace associated with VM 22A is the namespace corresponding to namespace identifier #1.

In some examples, in response to determining the one or more namespaces associated with the VM of VMs 22, VMM 20 may send, to the VM of VMs 22, a subset of the set of namespace identifiers (406). The subset of namespace identifiers may correspond to the one or more namespaces associated with the virtual machine. For example, VMM 20 may determine that a particular VM of VMs 22 is associated with all of the namespaces of storage device 6 and may send, to the particular VM of VMs 22, the respective namespace identifiers corresponding to each respective namespace of storage device 6. In other examples, VMM 20 may determine that a particular VM of VMs 22 is associated with fewer namespaces than the set of namespaces associated with storage device 6, and may send, to the particular VM of VMs 22, only the namespace identifiers that correspond to the namespaces associated with the particular VM of VMs 22.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components, The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   receiving, by virtual machine manager and from a virtual machine, a request for a set of namespace identifiers corresponding to a set of namespaces associated with one or more storage devices;
   determining, by the virtual machine manager, one or more namespaces associated with the virtual machine from the set of namespaces associated with the one or more storage devices; and
   in response to determining the one or more namespaces associated with the virtual machine, sending, by the virtual machine manager and to the virtual machine, a subset of the set of namespace identifiers, the subset of namespace identifiers corresponding to the one or more namespaces associated with the virtual machine.

2. The method of claim 1, further comprising:
   sending, by the virtual machine manager and to the one or more storage devices, an indication of the request for the set of namespace identifiers; and
   receiving, by the virtual machine manager and from the one or more storage devices, an indication of the set of namespace identifiers,
   wherein determining the one or more namespaces associated with the virtual machine from the set of namespaces is in response to receiving the set of namespace identifiers.

3. The method of claim 2, wherein the set of namespace identifiers is a first set of namespace identifiers, and wherein determining the one or more namespaces associated with the virtual machine from the set of namespaces associated with the one or more storage devices comprises:
   receiving, by the virtual machine manager, provisioning data that includes a second set of namespace identifiers that correspond to one or more namespaces the virtual machine is authorized to access; and determining, by the virtual machine manager, which namespace identifiers in the second set of namespace identifiers are also within the first set of namespace identifiers.

4. The method of claim 1, wherein the one or more namespaces associated with the virtual machine includes fewer namespaces than the namespaces associated with the one or more storage devices.

5. The method of claim 1, further comprising:

receiving, by the virtual machine manager and from the virtual machine, a request to create an I/O queue corresponding to a particular namespace of the one or more namespaces associated with the virtual machine; and in response to receiving the request to create the I/O queue, creating, by the virtual machine manager, the I/O queue corresponding to the particular namespace of the one or more namespaces associated with the virtual machine.

6. The method of claim 5, further comprising:

receiving, by the virtual machine manager and from the virtual machine, a second request to create a second, different I/O queue corresponding to a second, different namespace of the one or more namespaces associated with the virtual machine; and in response to receiving the second request to create the second, different I/O queue, creating, by the virtual machine manager, the second I/O queue corresponding to the second different namespace of the one or more namespaces associated with the virtual machine.

7. The method of claim 5, further comprising:

sending, by the virtual machine and directly to the I/O queue, a read command; and in response to sending the read command, receiving, by the virtual machine and directly from the one or more storage devices, data associated with the read command.

8. The method of claim 1, further comprising:

sending, by the virtual machine manager and to the one or more storage devices, provisioning data that indicates one or more namespaces the virtual machine is authorized to access.

9. A system comprising:

a computer host with a processor having a virtual machine; and a virtual machine manager connected to the virtual machine the virtual machine manager configured to:

receive, from the virtual machine, a request for a set of namespace identifiers corresponding to a set of namespaces associated with one or more storage devices;

determine one or more namespaces associated with the virtual machine from the set of namespaces associated with the one or more storage devices connected to the computer host; and in response to determining the one or more namespaces associated with the virtual machine, send, to the virtual machine, a subset of the set of namespace identifiers, the subset of namespace identifiers corresponding to the one or more namespaces associated with the virtual machine.

10. The system of claim 9, wherein the virtual machine manager is further configured to:

send, to the one or more storage devices, an indication of the request for the set of namespace identifiers; and receive, from the one or more storage devices, an indication of the set of namespace identifiers, wherein determining the one or more namespaces associated with the virtual machine from the set of namespaces is in response to receiving the set of namespace identifiers.

11. The system of claim 10, wherein the set of namespace identifiers is a first set of namespace identifiers, and wherein the virtual machine manager is configured to determine the one or more namespaces associated with the virtual machine from the set of namespaces associated with the one or more storage devices by being configured to:

receive provisioning data that includes a second set of namespace identifiers that correspond to one or more namespaces the virtual machine is authorized to access; and determine which namespace identifiers in the second set of namespace identifiers are also within the first set of namespace identifiers.

12. The system of claim 9, wherein the one or more namespaces associated with the virtual machine includes fewer namespaces than the set of namespaces associated with the one or more storage devices.

13. The system of claim 9, wherein the virtual machine manager is further configured to:

receive, from the virtual machine, a request to create an I/O queue corresponding to a particular namespace of the one or more namespaces associated with the virtual machine; and in response to receiving the request to create the I/O queue, create, the I/O queue corresponding to the particular namespace of the one or more namespaces associated with the virtual machine.

14. The system of claim 13, wherein the virtual machine manager is further configured to:

receive, from the virtual machine, a second request to create a sound, different I/O queue corresponding to a second, different namespace of the one or more namespaces associated with the virtual machine; and in response to receiving the second request to create the second, different I/O queue, create the second I/O queue corresponding to the second, different namespace of the one or more namespaces associated with the virtual machine.

15. The system of claim 13, wherein the virtual machine is further configured to:

send, directly to the I/O queue, a read command; and in response to sending the read command, receive, directly from the one or more storage devices, data associated with the read command.

16. The system of claim 9, wherein the virtual machine manager is further configured to:

send, to the one or more storage devices, provisioning data that indicates one or more namespaces the virtual machine is authorized to access.

17. A non-transitory computer-readable storage medium encoded with instructions that, when executed, cause one or more processors of a host device to:

receive, from a virtual machine, a request for a set of namespace identifiers corresponding to a set of namespaces associated with one or more storage devices;

determine one or more namespaces associated with the virtual machine from the set of namespaces associated with the one or more storage devices; and in response to determining the one or more namespaces associated with the virtual machine, send, to the virtual machine, a subset of the set of namespace identifiers, the subset of namespace identifiers corresponding to the one or more namespaces associated with the virtual machine.

18. The non-transitory computer-readable storage medium of claim 17, further comprising instructions that, when executed, cause the one or more processors of a host device to:
  send, to the one or more storage devices, and indication of the request for the set of namespace identifiers; and
  receive, from the one or more storage devices, an indication of the set of namespace identifiers;
  wherein determining the one or more namespaces associated with the virtual machine from the set of namespaces is in response to receiving the set of namespace identifiers.

19. The non-transitory computer-readable storage medium of claim 17, wherein the set of namespace identifiers is a first set of namespace identifiers, and wherein the instructions cause the one or more processors to determine the one or more namespaces associated with the virtual machine from the set of namespaces associated with the one or more storage devices by at least causing the processor to:
  receive provisioning data that includes a second set of namespace identifiers that correspond to one or more namespaces the virtual machine is authorized to access; and
  determine which namespace identifiers in the second set of namespace identifiers are also within the first set of namespace identifiers.

20. The non-transitory computer-readable storage medium of claim 17, further comprising instructions that, when executed, cause the one or more processors of a host device to:
  send, to the one or more storage devices, provisioning data that indicates one or more namespaces the virtual machine is authorized to access.

* * * * *